(12) United States Patent
Yoshihara et al.

(10) Patent No.: US 8,632,906 B2
(45) Date of Patent: Jan. 21, 2014

(54) BATTERY-CELL MODULE STRUCTURE OF BATTERY

(75) Inventors: Toshikazu Yoshihara, Saitama (JP); Shinichi Yoshioka, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 1021 days.

(21) Appl. No.: 12/599,155

(22) PCT Filed: Apr. 10, 2008

(86) PCT No.: PCT/JP2008/057059
§ 371 (c)(1),
(2), (4) Date: Nov. 6, 2009

(87) PCT Pub. No.: WO2008/142924
PCT Pub. Date: Nov. 27, 2008

(65) Prior Publication Data
US 2010/0209760 A1    Aug. 19, 2010

(30) Foreign Application Priority Data
May 10, 2007   (JP) .................................. 2007-125996

(51) Int. Cl.
*H01M 6/12*   (2006.01)
*H01M 2/10*   (2006.01)
*H01M 10/50*  (2006.01)

(52) U.S. Cl.
USPC ............. 429/162; 429/99; 429/175; 429/177; 429/148; 429/163; 429/120

(58) Field of Classification Search
USPC ............................ 429/96–100, 162, 148, 153
See application file for complete search history.

(56) References Cited

U.S. PATENT DOCUMENTS

| | | | |
|---|---|---|---|
| 6,007,942 A * | 12/1999 | Mistry | 429/100 |
| 7,074,517 B2 * | 7/2006 | Higashino | 429/66 |
| 2001/0046624 A1 * | 11/2001 | Goto et al. | 429/99 |
| 2005/0089751 A1 * | 4/2005 | Oogami et al. | 429/162 |
| 2006/0234119 A1 * | 10/2006 | Kruger et al. | 429/160 |
| 2006/0286450 A1 * | 12/2006 | Yoon et al. | 429/180 |

FOREIGN PATENT DOCUMENTS

| | | |
|---|---|---|
| JP | 07-142043 A | 6/1995 |
| JP | 2002-298805 A | 10/2002 |
| JP | 2004-311318 A | 11/2004 |
| JP | 2006-092884 A | 4/2006 |
| JP | 2006-185670 A | 7/2006 |

\* cited by examiner

*Primary Examiner* — Maria J Laios
(74) *Attorney, Agent, or Firm* — Foley & Lardner LLP

(57) ABSTRACT

A battery-cell structure of a battery is constructed to have a resinous spacer 5 with a frame shape surrounding thick central portions between a battery cell 3 arranged at an upper side and a battery cell 4 arranged at a lower side, and ventilation portions 62 and 64 that are provided in the resinous lower case 6 to communicate the exterior with depressed portions 61 of the resinous lower case 6 and have an up- and down symmetrical shape and size. It is constructed so that the battery cell 3 arranged at the upper side and the battery cell 4 arranged at the lower side are put in a vertical direction between the resinous lower case 6, the spacer 5 and the upper case 2.

5 Claims, 9 Drawing Sheets

FIG. 4
(a)
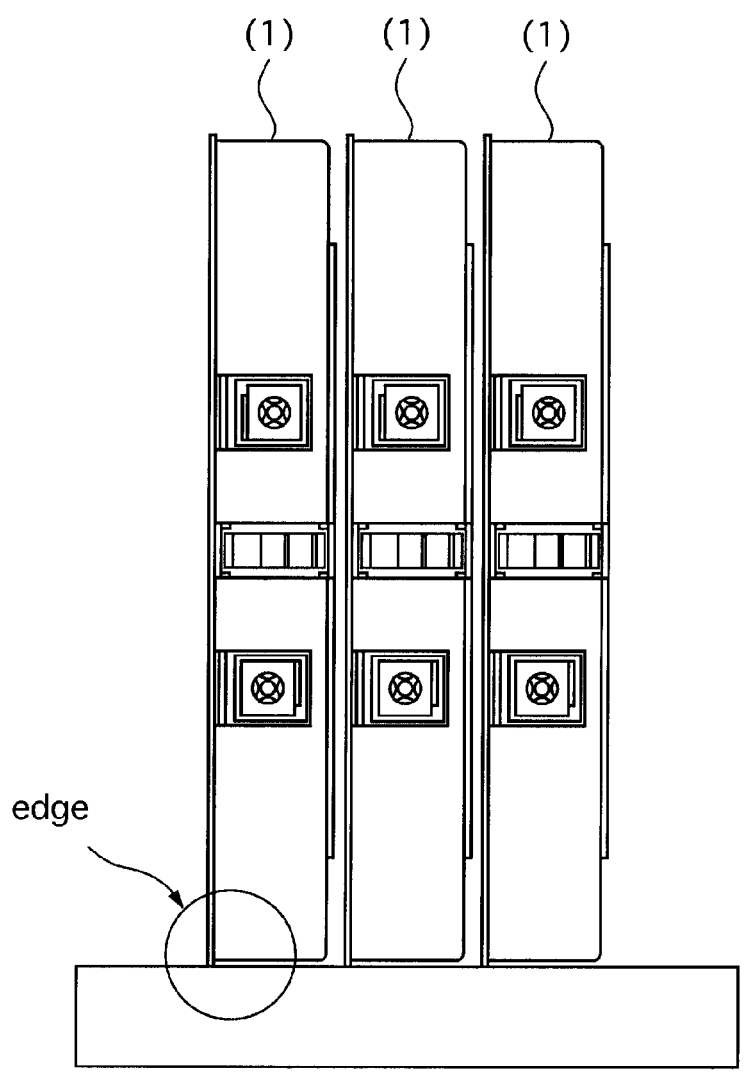
edge
(b)
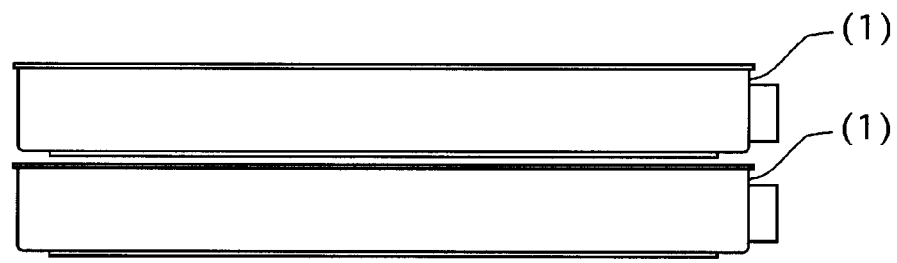

BATTERY-CELL MODULE STRUCTURE OF BATTERY

TECHNICAL FIELD

The present invention relates to a technology of a battery-cell module structure of a battery.

BACKGROUND OF THE INVENTION

A conventional battery-cell module structure of a battery includes a metal container main body and a metal lid to be constructed as a battery accommodating case that has air permeability to communication between an interior and an exterior of the case, where the metal container main body is formed with an opening at-least one side thereof and contains a flat-type assembled battery in which thin batteries are piled up, and the metal lid closes the opening of the metal container main body. A peripheral end portion of an opening end portion of the metal container main body and a peripheral end portion of an end portion of the metal lid are rolled and caulked with each other to construct the battery-cell module structure (For example, refer to Patent Document 1).

Patent Document 1: Japanese Patent Application Laid-Open Publication No. 2006-92884 (page 2-8 and all of Figures)

DISCLOSURE OF THE INVENTION

Problem(s) to be Solved by the Invention

However, in the conventional battery-cell module structure of the battery, there is a problem in that the direction for stacking layers of the battery-cell modules is limited, because the peripheral end portion of the opening portion of the metal container main body and the peripheral end portion of the end portion of the metal lid are rolled up and caulked with each other so that projecting portions are formed due to rolling-up and caulking on side surfaces of the battery accommodating case. In addition, there is another problem in that the variation in temperature occurs between battery cells arranged at both end sides and those arranged therebetween, because several sheets of the battery cells are contained in the battery accommodating case and consequently the quantities of heat are different from each other between the battery cells at the both end sides and therebetween. Further, there is the other problem in that a weight per one module increases and burden on assembly workers becomes larger, because the number of the battery cells is large.

The present invention is made to solve the above-described problems, and its object is to provide a battery-cell module structure of a battery that enables a container main body and a lid to be easily connected with each other without using a rolling-up and caulking method which limits a direction for stacking layers of a battery cell module, suppressing the variation in temperature between battery cells and also decreasing burden on assembly workers.

Means for Solving the Problems

In order to achieve the above object, in the present invention, a battery-cell module structure of a battery is constructed to include a resinous container main body that is formed to have an inner space and an opening portion that opens upward, a battery cell consisting of one flat upper side assembled battery and one flat lower side assembled battery that have a thick center portion and a thin peripheral end portion, the flat upper side assembled battery and the flat lower side assembled battery being piled up in a vertical direction in the inner space, a resinous frame body that surrounds the thick central portions between the thin peripheral end portions of the flat upper side assembled battery arranged at an upper side and the flat lower side assembled battery arranged at a lower side, a resinous lid part that closes the opening portion of the resinous container main body, and a ventilating means that is provided on the resinous container main body and has up- and down symmetrical shape and size so as to communicate the inner space of the resinous container main body with an exterior of the ventilating means in such a way that the ventilating means cools the flat upper side assembled battery and the flat lower side assembled battery, suppressing a variation in temperature between the lat upper side assembled battery and the flat lower side assembled battery, where the flat upper side assembled battery arranged at the upper side and the flat lower side assembled battery arranged at the lower side are put in the vertical direction between the resinous container main body, the resinous frame body and the resinous lid part. A part of the resinous lid part is formed as a metal portion, and the metal portion is contacted with at least one of a top surface and a bottom surface of the flat upper side assembled battery.

Effect of the Invention

Therefore, in the present invention, the container main body and the lid part can be easily fixed with each other without using a rolling-up and caulking method, which limits a direction for stacking the battery cell modules, and it can suppress a variation in temperature between the battery cells, decreasing burden on assembly workers.

BRIEF DESCRIPTION OF THE DRAWINGS

FIG. 4 is a view showing a stacking state of the battery cell modules, (a) is a view explaining impossibility of standing the battery cell modules in a state where side wall portions thereof in a thick direction are turned downward in a case where the battery cell modules with an upper case and a lower case that are fixed with each other by using a rolling-up and caulking method are piled up, and (b) is a view explaining a state where the battery cell modules formed by using the rolling-up and caulking method are flat-piled;

DESCRIPTION OF REFERENCE NUMBERS

Figure 1:
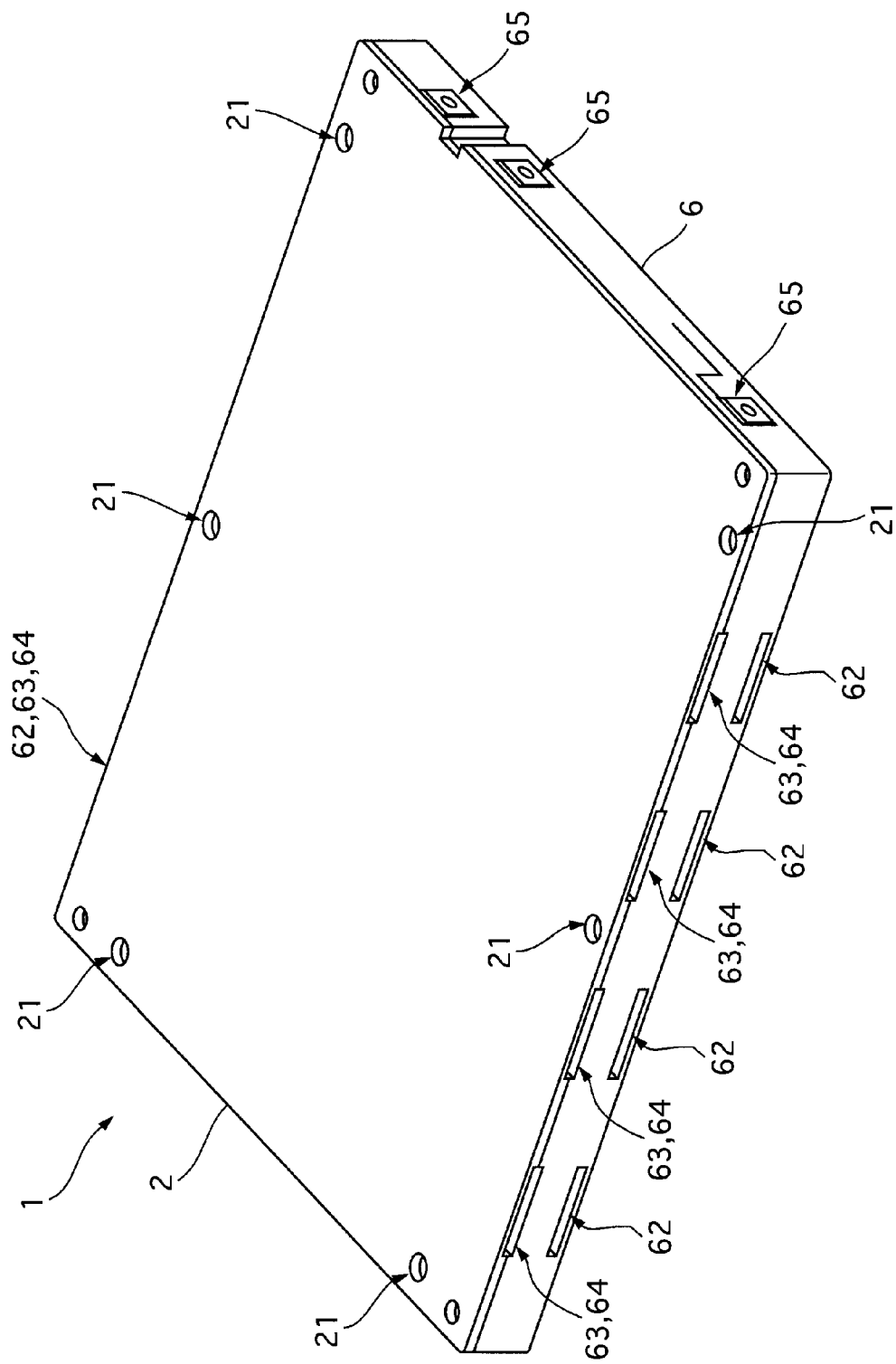
FIG. 1 is a perspective view showing a battery cell module of a battery of a first embodiment according to the present invention.

1 battery cell module
2 upper case 21 attachment hole
22 metal portion
23 resinous frame portion
3 battery cell
31 hole portion (for fixing)
32 positioning hole portion
33 film peripheral end portion
4 battery cell
41 hole portion (for fixing)
42 positioning hole portion
43 film peripheral end portion
5 spacer
51 positioning hole portion
6 lower case
61 depressed portion
611 locating pin
62 ventilation portion
63 groove portion
64 ventilation portion
65 end terminal
66 metal portion
7 screw

BEST MODE FOR CARRYING OUT THE INVENTION

Hereinafter, embodiments that realize a battery-cell module structure of a battery according to the present invention will be described with reference to the accompanying drawings.

First Embodiment

First, a construction of a battery-cell module structure of a battery of a first embodiment will be described.

Figure 2:
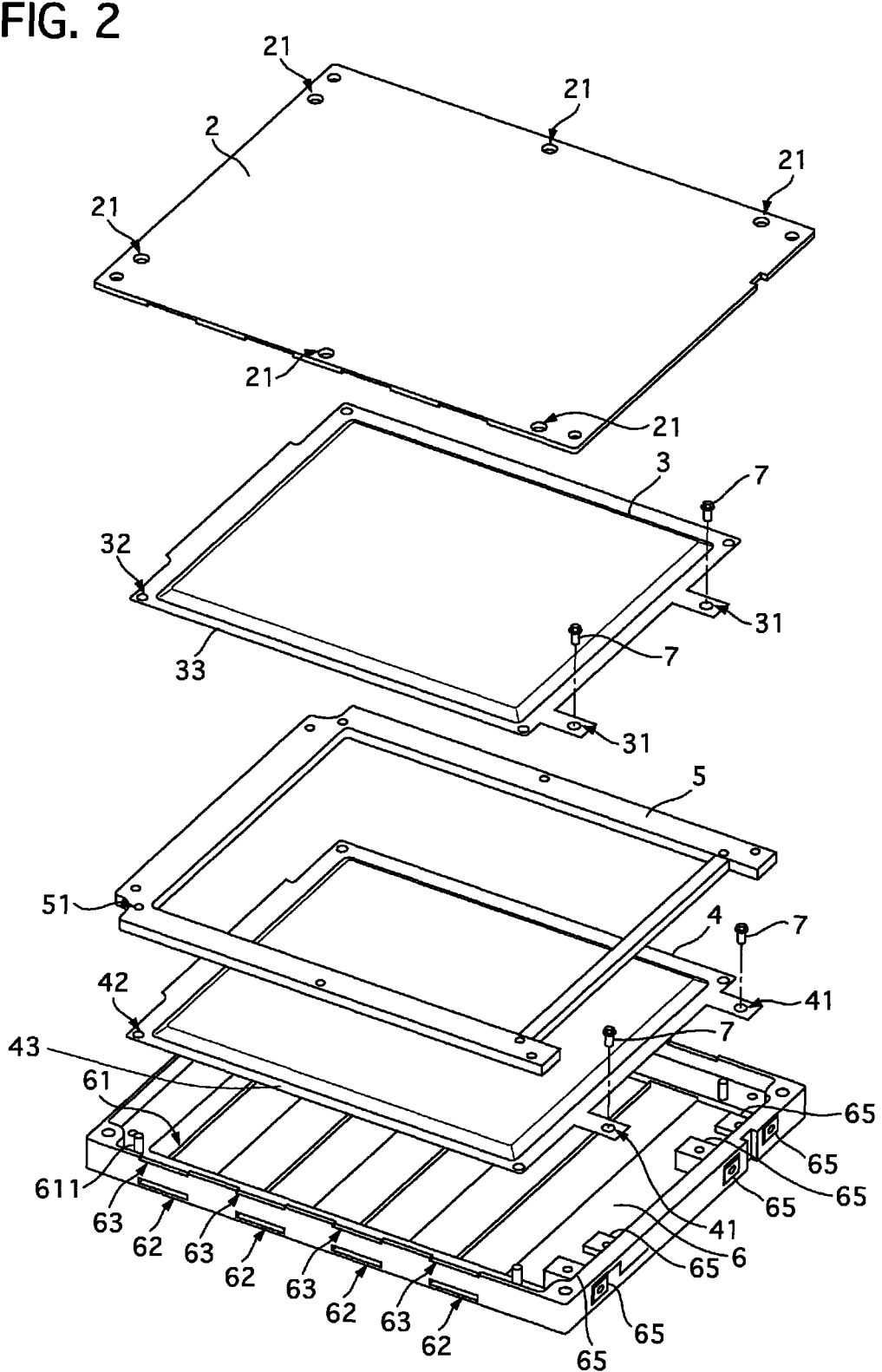
FIG. 2 is an exploded perspective view showing the battery cell module of the battery of the first embodiment.

FIG. 1 is a perspective view showing a battery cell module of the battery of the first embodiment. FIG. 2 is an exploded perspective view showing the battery cell module of the battery of the first embodiment.

The battery cell module 1 is made of resin, and one module or a plurality of the modules constitute the battery that is mounted on a motor vehicle and the like for example. It is equipped with end terminals for supplying electric power to an exterior (for example, a drive motor of the motor vehicle). The battery cell module 1 of the first embodiment mainly consists of an upper case 2, battery cells 3 and 4, a spacer 5 and a lower case 6.

The upper case 2 is formed to have a shape like a wide rectangular plate, and it is fixed to the lower case 6 by fastening screws that penetrate through a plurality of attachment holes 21 formed near a peripheral end portion of the upper case 2.

A bottom surface of the upper case 2 is formed to have a depressed shape that is depressed toward a downward direction to hold a thin film peripheral end portion 33 of the battery cell 3. Herein, the upper case 2 corresponds to a resin lid part of the present invention.

The battery cells 3 and 4 are constructed in such a way that the battery main body is outer-packaged, being put between films from an up- and down direction to form a thin peripheral end portion 33 of film, to seal the main body at the thin peripheral end portion 33. The hole portions 31 and 41 for fixing end terminals that project outward from one sides of the film peripheral end portions 33 and 43 are respectively provided, and positioning hole portions 32 and 42 for positioning are respectively provided at the other sides thereof. Herein, a lithium ion battery is given as an example of the battery.

Incidentally, the battery cell 3 corresponds to an upper flat-type assembled battery of the present invention, the battery cell 4 corresponds to a lower flat-type assembled battery of the present invention, and the thin peripheral end portion 33 corresponds to a thin portion of the present invention.

The spacer 5 is made of resin, being formed to have a shape like a rectangular frame. An outer side of the frame is formed to be insertable in an interior of the lower case 6, and an inner side of the frame is formed to have a size corresponding to positions of the film peripheral end portions 33 and 43 that are outer sides of the main bodies of the battery cells 3 and 4, respectively.

In addition, the spacer 5 is provided with a positioning hole portion 51 for positioning. Herein, the spacer 5 corresponds to a resinous frame body of the present invention.

The lower case 6 is made of resin, and it is formed to have a boxy shape that opens upward so that it has a wide bottom surface and wide depressed portion 61, being shaped like a thin plate as a whole. At an inner wall side of one of short side wall portions of the lower case 6, four end terminals 65 are provided by using an insert molding method so that it has a construction with one end portions thereof being exposed on the thin side wall portion and the other end portions being exposed on a bottom portion of the depressed portions 61 at positions of these end portions.

In addition, at both sides opposite to each other of the lower case 6 and at a lower side of a long side wall portion thereof, a plurality of ventilation portions 62 are provided to communicate the exterior of the lower case 6 and the interior of the depressed portion 61. Further, at the both opposite sides of the lower case 6 and at a top portion of the long side wall portion, a plurality of groove portions 63 are provided so that upper edges thereof are depressed in the downward direction. Herein, the lower case 6 corresponds to a resin container main body of the present invention.

The groove portions 63 form ventilation portions 64 to communicate the exterior of the lower case 6 and the interior of the depressed portions 61, with the upper case 2 being attached on the lower case 6 so as to cover the depressed portion 61.

In addition, on the depressed portion 61 of the lower case 6, locating pins 611 are provided for positioning. Furthermore, the bottom portion of the depressed portion 61 of the lower case 6 is formed to have a depressed shape that is depressed downside to hold the thin film peripheral end portion 33 of the battery cell 4.

Next, an assembly construction of the battery-cell module structure of the battery of the first embodiment will be described.

First, the battery cell 4 is placed in the depressed portion 61 of the lower case 6 so that the positioning hole portions 42 of the film peripheral end portion is inserted through by the locating pins 611, and then they are fixed on each other by screws 7 being fastened into certain two ones of the end terminals 65, which are formed on the lower case 6 by using an insert molding method, through hole portions 41 of the film peripheral end portion 43.

Next, the spacer shaped like a frame is placed in the depressed portion 61 of the lower case 6, on the film peripheral end portion 43 of the battery cell 4 so that the locating pins 611 pass through the positioning hole portions 51. Then, the film peripheral end portion 33 of the battery cell 3 is placed on the spacer 5 shaped like the frame, and the locating pin 611 is inserted through the positioning hole portion 32 of the film peripheral end portion 33. Further, they are fixed on each other by screws 7 being fastened into certain two ones of the end terminals 65, which are formed on the lower case 6 by using an insert molding method, through hole portions 31 of the film peripheral end portion 33.

Then, the upper case 2 is fixed on the battery cell by fastening screws that pass through attachment holes 21 so that the upper case 2 covers the depressed portion 61 of the lower case 6. Incidentally, the attachment of the lower case 6 and the upper case 2 may be performed by using a thermal caulking method, an adhesive joining method or the like instead of the thread fastening method.

In the battery cell module 1 of the first embodiment, the film peripheral end portions 33 and 43 of the battery cells 3 and 4 are held, being put between the upper case 2, the spacer 5 and the lower case 6, in such a way that the module 1 is constructed so that the top surface of the battery cell 3 and the bottom surface of the battery cell 4 are cooled down by air flow passing through the ventilation portions 62 and 64.

The operation of the battery-cell module structure of the battery of the first embodiment will be described.

<The Operation of Assembly by Using an Easy Construction Method>

The battery cell module 1 of the first embodiment is constructed so that the film peripheral end portions 33 and 43 of the battery cells 3 and 4 are held, being put between the upper case 2, which is made of resin, the spacer 5 and lower case 6.

In other words, the battery cells 3 and 4 constitute one battery cell module 1. This can provide a holding structure having a relative margin, thereby enabling an allowable amount of deformation thereof to be larger. In addition, the allowable amount of deformation can be also larger because of the holding structure, using resin, which sandwiches them.

Further, they are easily processed because they are made of resin, and an influence on the whole thereof is smaller relative to those made of metal even when they are partially heat-deposited or so.

Accordingly, the attachment method of the upper case 2 and the lower case 6 can employ an easy construction method and a high degree of freedom by using a thermal caulking method, a rivet fastening method, a deposition method and others.

<The Operation of Assembly from One Direction>

In the battery cell module 1 of the first embodiment, the four end terminals 65, which are projected inside of the depressed portion 61 through the inner wall of the lower case 6 at one side of walls, are arranged parallel to each other so that they are not overlapped with each other. On the other hand, when the battery cells 3 and 4 are set in the upper case 2 and the lower case 6 combined with the spacer 5 arranged therebetween, the end terminals of the battery cells 3 and 4 are also arranged parallel to each other so that they are not overlapped with each other. In addition, the two hole portions 31 of the battery cell 3 are set to correspond with the hole portions 65 of the two end terminals arranged at higher positions of the lower case 6, while the two hole portions 41 of the battery cell 4 are set to correspond with the hole portions 65 of the two end terminals arranged at lower positions of the lower case 6.

Further, the battery-cell module structure is constructed so that the cases 2 and 6 and the spacer 5 are connected by the locating pins 611 being inserted through the positioning hole portions 32, the positioning hole portions 42 and the positioning hole portions 51.

In addition, as explained above, the module is constructed so that the film peripheral end portions 33 and 43 of the battery cells 3 and 4 are put in a the same direction as a vertical assembly direction between the uppers case 2, the spacer 5 and the lower case 6.

Therefore, in the battery cell module 1 of the first embodiment, the upper case 2 can be assembled with the lower case 6 so as to cover the battery cell 4 placed in the depressed portion 61, the spacer 5 located on the battery cell 4, the battery cell 3 located on the spacer 5 and the depressed portion 61.

<The Operation for Suppressing the Variation in Temperature Between the Battery Cells>

The battery cell module 1 of the first embodiment daringly consists of two battery cells, and they are cooled down by the same cooling structures; the plurality of the ventilation portions 64 that are provided in the upper case 2 in the opposite directions and the plurality of the ventilation portions 62 that are provided in the lower case 6 in the opposite directions.

For example, the opposite directions of the ventilation portions 62 and 64 are set to be arranged along a longitudinal direction of the motor vehicle to take in air flow generated when the motor vehicle runs, or it is set to be arranged along air flow generated by a blower means that is provided at the outer side of the motor vehicle, so as to cool the top surface of the battery cell 3 and the bottom surface of the battery cell 4. In this case, cooling surface areas and the like of the interiors of the battery cells 3 and 4 are set to be symmetrical to each other. This brings the same conditions, and accordingly coolability is not inclined.

In addition, the wide surfaces of the battery cell 3 and the upper case 2 face to each other, functioning as a cooling surface, while the wide surfaces of the battery cell 4 and the lower case 6 face to each other, functioning as a cooling surface.

Thus the cooling condition due to the heat transfer between the surfaces and the exterior becomes substantially the same, and accordingly the coolability is not inclined.

In other words, the number of battery cells is daringly set to be two in the battery cell module 1 of the first embodiment, while, when it is set to be three for example, the variation in temperature between the battery cells becomes larger because a central battery cell cannot avoid from the accumulation of heat relative to the upper and lower battery cells. However, the battery cell module 1 of the first embodiment can provide a uniform and good cooling performance, thereby suppressing the variation in temperature between the battery cells.

<The Operation for Decreasing Burden on Assembly Workers>

The battery cell module 1 of the first embodiment daringly consists of two battery cells, and accordingly it becomes lighter in weight relative to the conventional ones consisting of more-than-two battery cells that are piled up.

As a result, the burden on the assembly workers becomes smaller when the plurality of battery modules 1 are arranged to constitute a battery.

<The Operation for Improving the Degree of Freedom of Piling-Up>

Figure 3:
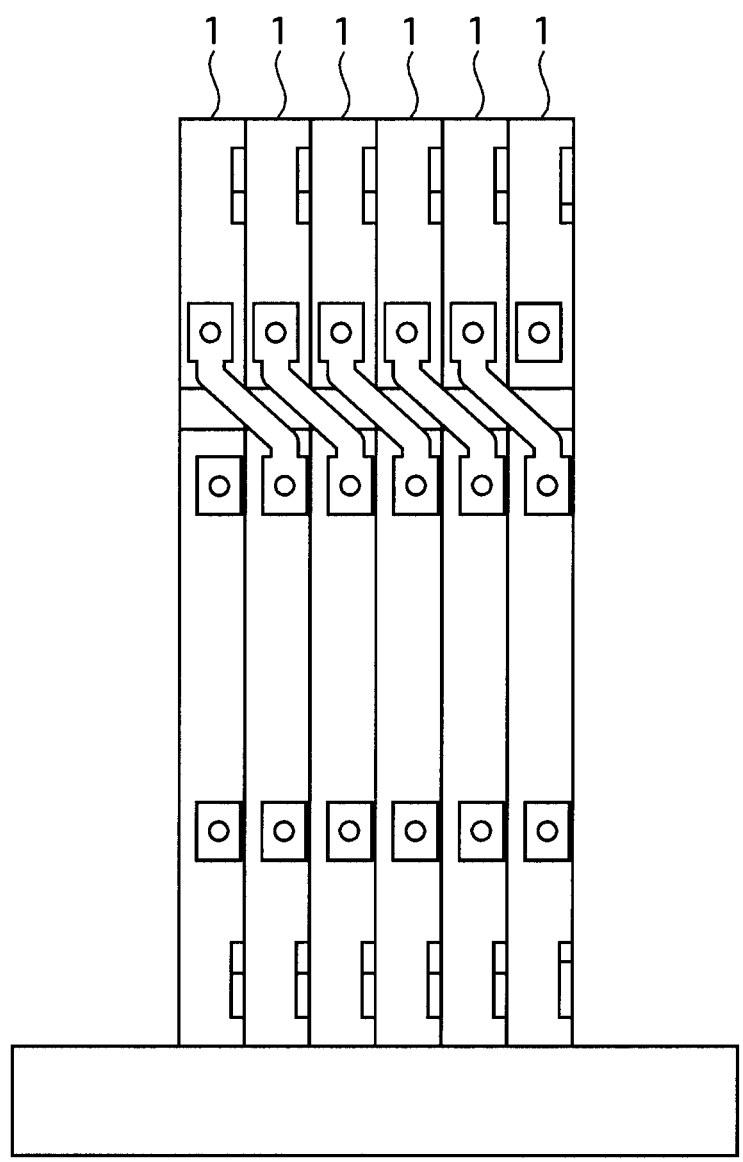
FIG. 3 is a view explaining a case where the battery cell modules of the first embodiment are piled up.

FIG. 3 is a view explaining a case where the battery modules are piled up. FIG. 4 is a view explaining a piled-up state of the battery modules.

In the battery module 1 of the first embodiment, the upper case 2 can be fixed on the lower case 6 by using a screw fastening method, a thermal caulking method, an adhesion method, a deposition method and others, so that, as shown in FIG. 3, the battery modules 1 can be placed in a state where the side wall portions in a thickness direction are turned downward. Further, it is easy for the modules to be piled up in a horizontal direction.

For example, if the lower case 6 and the upper case 2 are rolled up and caulked with each other, their edge portions are projected in a side direction, due to rolling-up and caulk, and accordingly the modules cannot be placed in a state where the side wall portions in the thickness direction are turned downward. That is, this case cannot perform the state shown in FIG. 4(a). They can only be flat-piled as shown in FIG. 4(b).

As explained above, the battery cell module 1 of the first embodiment can improve the degree of freedom of piling-up. The battery cell modules 1 can be piled up in the horizontal direction, in a case where they cannot be mounted on a device or a motor vehicle, due to space thereof except piling-up in the horizontal direction.

Next, the effects of the battery-cell module structure of the battery of the first embodiment will be described.

The battery-cell module structure of the battery of the first embodiment can provide the effects listed below.

(1) It has the lower case 6, the battery cells 3 and 4, the spacer 5 and the upper case 2, where the lower case 6 is made of resin and formed with the depressed portion 61 and the opening portion on the upper surface, the battery cells 3 and 4 have the central portions with the larger thickness and formed with the thin film peripheral end portions 33 and 43 at the peripheral end portions thereof, being piled up in the vertical direction to be placed into the depressed portion 61, the spacer 5 is made of resin and formed like the frame shape surrounding the thick central portions between the thin portions of the battery cell 3 arranged at the upper side and the battery cell 4 arranged at the lower side, and the upper case 2 closes the opening portion of the lower case 6 made of resin. The battery cell 3 arranged at the upper side and the battery cell 4 arranged at the lower side are stacked in the vertical direction between the lower case 6, the spacer 5 and the upper case 2, where all of them are made of resin. Therefore, the resin container main body and the resin lid part can be easily jointed with each other without a joint by rolling-up and caulking, which limits the piling-up direction of the battery cell modules. In addition, in this case, they can be assembled from the one direction by an easier process, and accordingly the burden on the assembly workers can be decreased.

(2) In the construction of (1), the ventilation portions 62 and 64 are provided on the lower case 6 made of resin, having the upper and lower symmetrical shapes and sizes to communicate the depressed portion 61 of the lower case 6 made of resin and the exterior thereof with each other. Therefore, it can sufficiently improve the cooling performance, thereby suppressing the variation in temperature between the battery cells.

(3) In the construction of (1) or (2), the locating pins 611 and the positioning hole portions 31, 42 and 51 are provided, where the locating pins 611 are formed on the bottom portion of the depressed portion 61 of the lower case 6 made of resin to project upward, and the positioning hole portions 31, 42 and 51 are provided on the battery cells 3 and 4 and the spacer 5, respectively, so that the locating pins 611 are inserted therethrough. Therefore, the module can be easily assembled from one direction.

Second Embodiment

A second embodiment according to the present invention is an example of a construction where a part of an upper case and a lower case is made of metal, the part being contacted with the battery cells.

Figure 5:
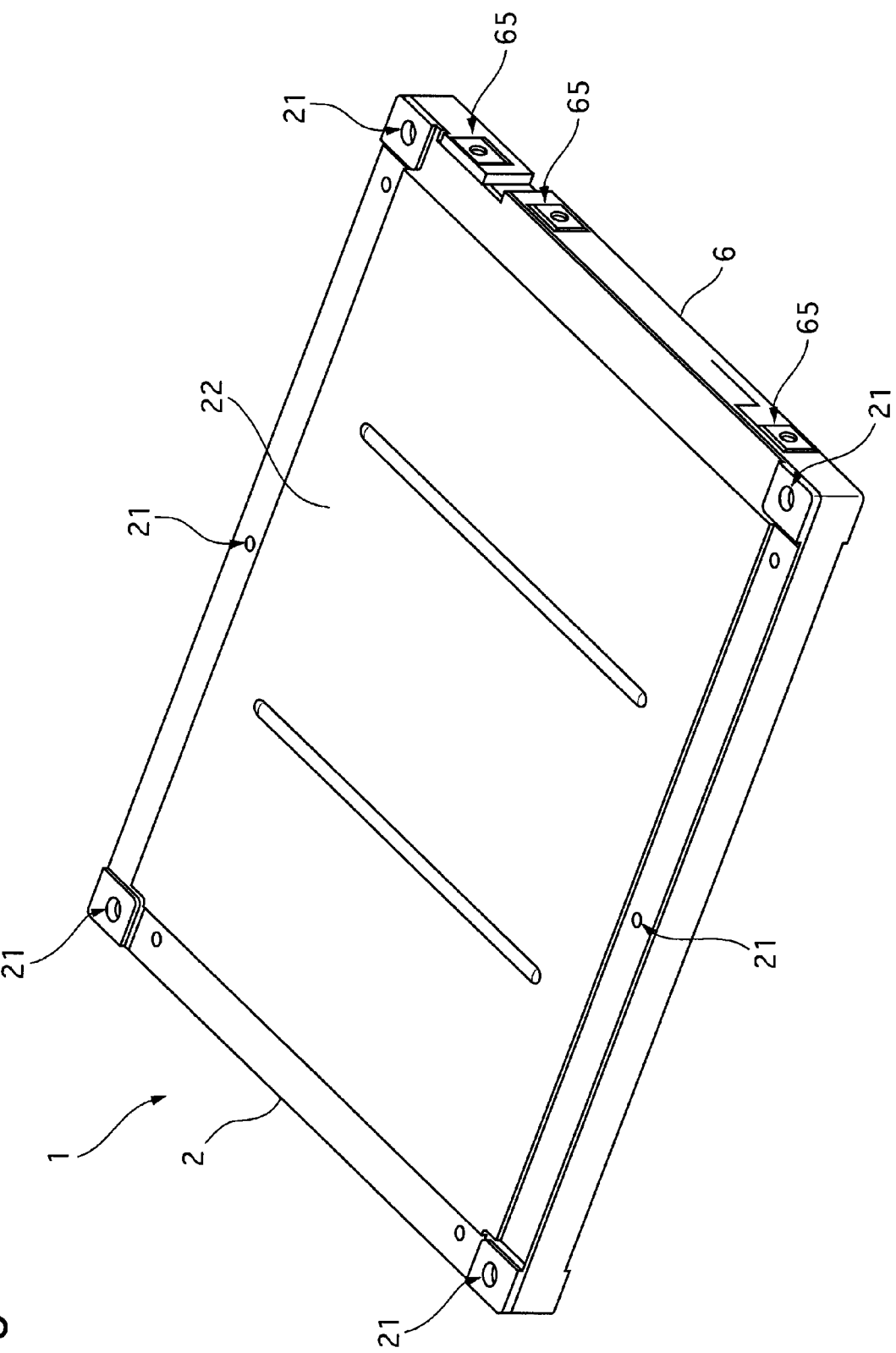
FIG. 5 is a perspective view showing a battery cell module of a battery of a second embodiment according to the present invention.
Figure 6:
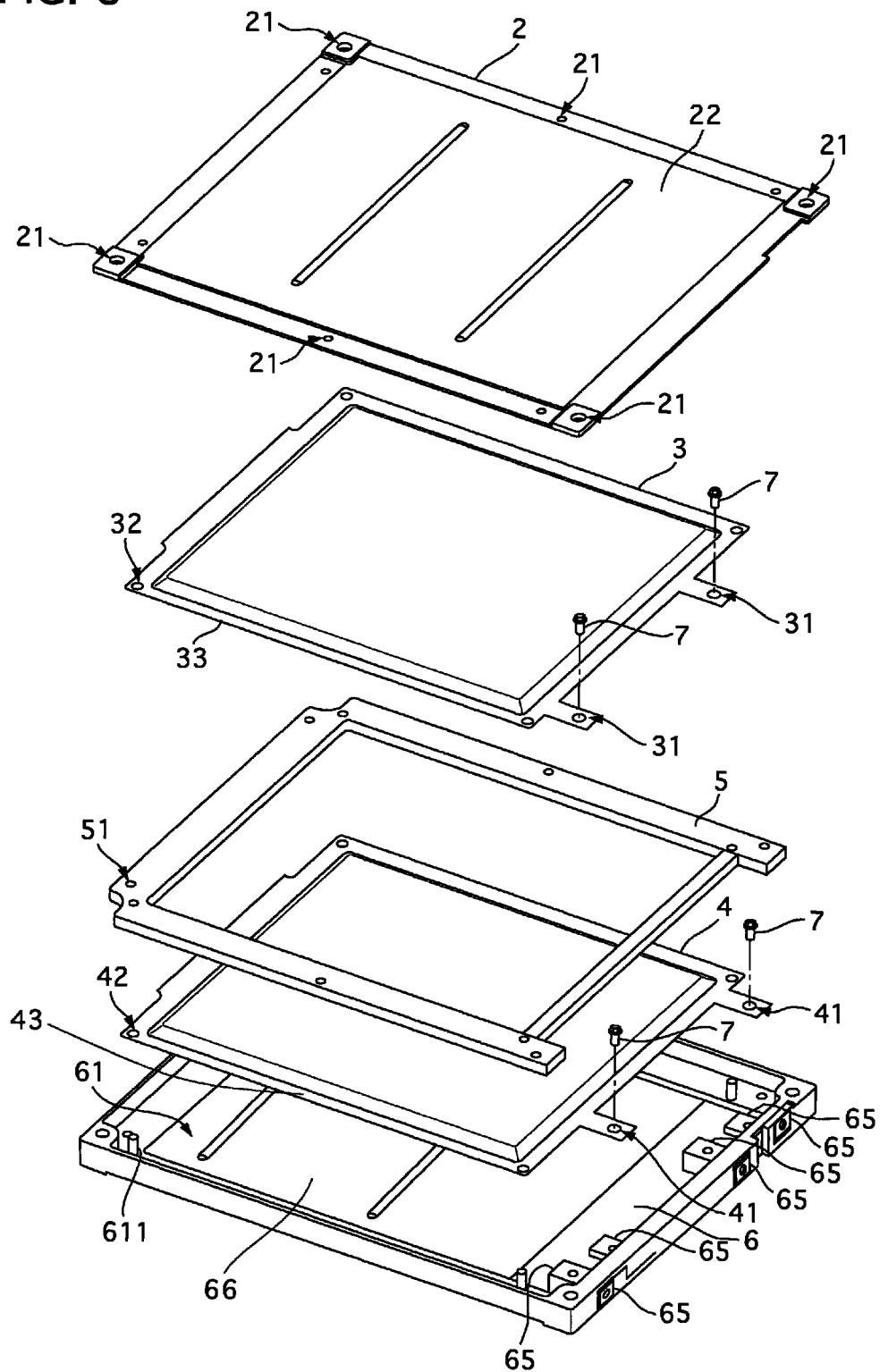
FIG. 6 is an exploded perspective view showing the battery cell module of the battery of the second embodiment.

A construction of a battery-cell module structure of a battery of the second embodiment will be described with reference to the accompanying drawings. FIG. 5 is a perspective view showing the battery cell module of the battery of the second embodiment. FIG. 6 is an exploded perspective view showing the battery cell module of the battery of the second embodiment.

In the battery-cell module structure of the battery of the second embodiment, a portion for screw fastening at one side is made of resin, where the one side is opposite to one edge portion of an upper case 2 corresponding to a side where end terminals 65 of a lower case 6 are provided. The other portion thereof is made of metal to form a metal portion 22. For example, as the upper case 2, a resinous portion fixed on an aluminum plate by thermal caulking is given. Thus the metal portion with one wide surface is formed.

Next, the lower case 6 is constructed so that a portion that is provided with end terminals 65, a depressed portion 61 and locating pins 611 is made of resin, and the other portion forming a bottom portion of the depressed portion is made of metal to form the metal portion 66. For example, as the lower case 6, a resinous portion fixed on an aluminum plate by thermal caulking is given.

Incidentally, the metal portion 22 and the resinous portion of the upper case 2, and the metal portion 66 and the resinous portion of the lower case 6 may be obtained by a fixation thereof using other methods such as an insert molding and an adhesion method.

Further, it is constructed so that the top surface of the battery cell 3 is contacted with the metal portion 22 of the upper case 22 and so that the bottom surface of the battery cell 4 is contacted with the metal portion 66 of the lower case 6.

Incidentally, although the ventilation portions 62 and 64 are not provided in the second embodiment, they may be provided. In that case, a part of the metal portions 22 and 66 are not contacted with the surfaces so as to allow the air to flow between the exterior and the interior through the ventilation portions 62 and 64.

The other constructions are similar to those of the first embodiment, and their explanations are omitted.

The operation of the battery-cell module structure of the battery of the second embodiment will be described.
<The Operation for Decreasing the Variation in Temperature Between the Battery Cells>

Figure 7:
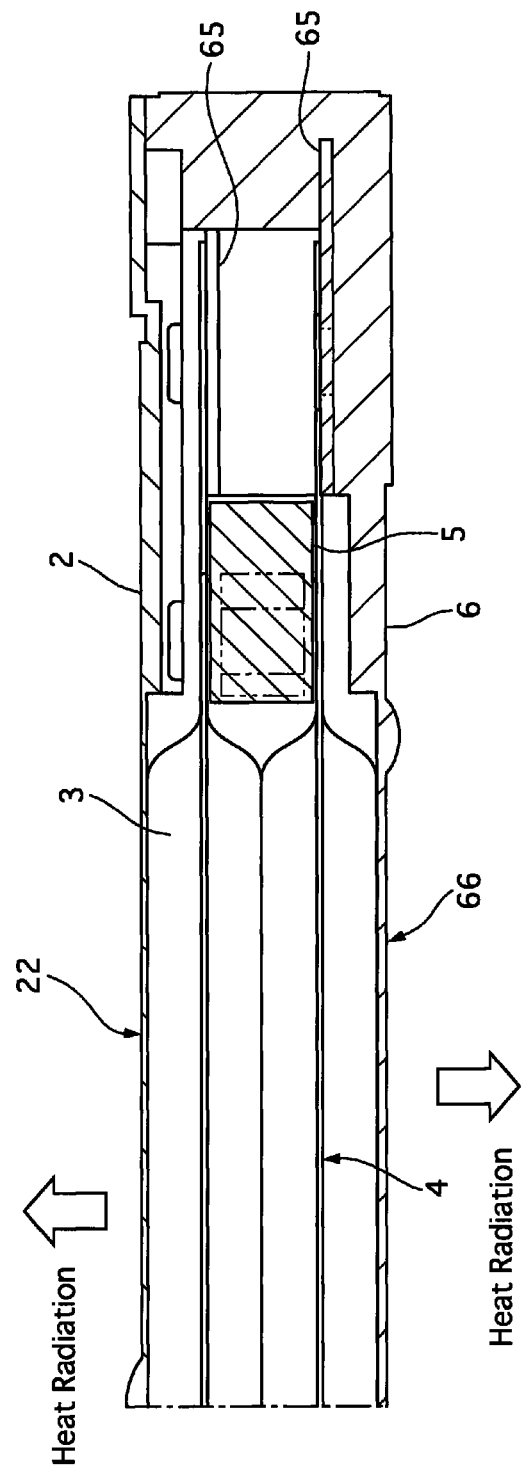
FIG. 7 is a cross sectional view of battery cell module of the battery of the second embodiment.

FIG. 7 is a cross sectional view showing the battery cell module of the battery of the second embodiment.

In the battery cell module 1 of the second embodiment, the number of battery cells is daringly set to be two, and the top surface of the battery cell 3 is contacted with the metal portion 22 of the upper case 2, and the bottom surface of the battery cell 4 is contacted with the metal portion 66. This enables the upper battery cell 3 and the lower battery cell 4 to be cooled down by using the same cooling structure (Refer to FIG. 7).

In other words, the top surface of the battery cell 3 and the bottom surface of the battery cell 4 are cooled down, and the cooling surface areas and the like of the interiors thereof have a symmetrical shape. This brings the same condition to the battery cells 3 and 4, and accordingly there is no inclination in cooling.

In addition, the contact with the metal portions 22 and 66 enables the cooling efficiency to become higher because of their high heat transfer. Thus, in the second embodiment, the coolability is further improved so that cooling performance becomes uniform and better. This can suppress the variation in temperature between the battery cells.

The effects of the battery-cell module structure of the battery of the second embodiment will be described.

The battery-cell module structure of the battery of the second embodiment has the following effects in addition to the above effects (1) and (3).

(4) In the construction of (1) or (3), the battery cell module is constructed so that the upper case 2 and the lower case 6 are provided with the metal portions 22 and 66 which are contacted with the top surface of the battery cell 3 and the bottom surface of the battery cell 4, respectively. Therefore, the heat radiation due to heat transfer of the battery cells 3 and 4 are improved, thus suppressing the variation in temperature between the battery cells due to this improved coolability.

The other operation and the effects are similar to those of the first embodiment, and accordingly they are omitted.

Third Embodiment

A third embodiment according to the present invention is an example where it is constructed so that a part of an upper case and a lower case are made of metal, which is contacted with battery cells.

A construction of a battery-cell module structure of a battery of the third embodiment will be described with reference to the accompanying drawings.

Figure 8:
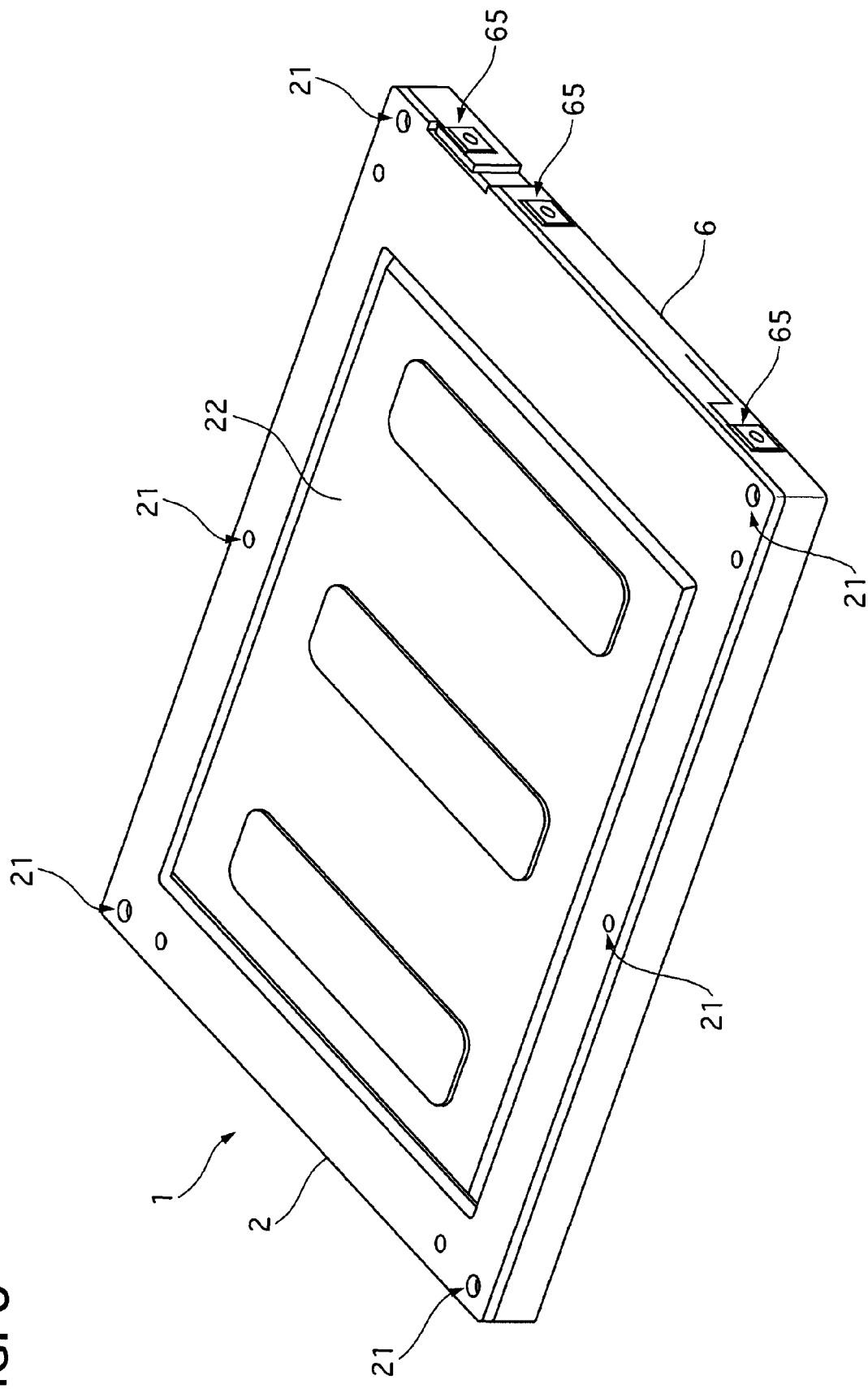
FIG. 8 is a perspective view showing a battery cell module of a battery of a third embodiment according to the present invention.
Figure 9:
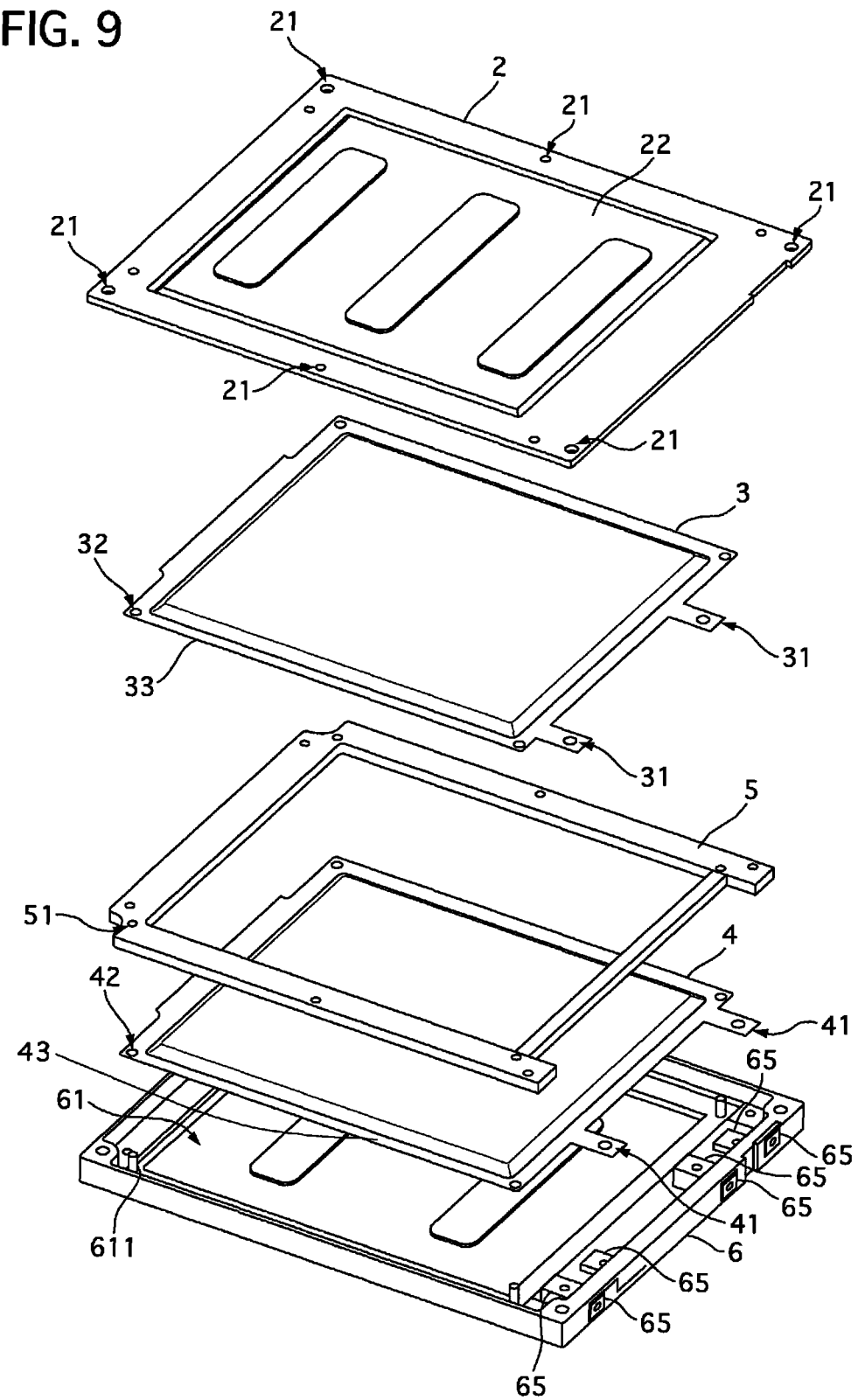
FIG. 9 is an exploded perspective view showing the battery cell module of the battery of the third embodiment.

FIG. 8 is a perspective view showing a battery cell module of a battery of the third embodiment. FIG. 9 is an exploded perspective view showing the battery cell module of the battery of the third embodiment.

In the third embodiment, an upper case is made of resin so as to have a shape like a frame, forming a resinous frame portion 23, which includes a portion for screw fastening at a side opposite to one edge of the upper case 2 corresponding to a side where end terminals 65 of a lower case 6 are provided. In addition, an inner side portion of the resinous frame portion 23 is made of metal to form a metal portion 22. For example, as the upper case 2 of the third embodiment, a resinous portion fixed on an aluminum plate by an insert-molding method is given. Thus, one wide surface of a metal portion is formed.

The other constructions are similar to those of the second embodiment, and accordingly they are omitted.

The operation of the battery-cell module structure of the battery of the third embodiment will be described.
<The Operation for Improving the Correspondency to the Expansion of the Interior>

A battery cell module 11 of the third embodiment has an upper case 2 consisting of a resinous frame portion 23 and a metal portion 22.

Thus, the more deformation of the metal portion 22 can be allowed, because the whole frame portion holds the metal portion 22 shaped like a plate.

The metal portion 22 is contacted with a top surface f a battery cell 3, so that the deformation and expansion of the interior have an influence on the upper case 2. However, the resinous frame portion 23 holds the metal portion 22, allowing the larger deformation thereof. Therefore, correspondency to the expansion of the interior can be improved.

The effects of the battery-cell module structure of the battery of the third embodiment will be described.

The battery-cell module structure of the battery of the third embodiment has the following effects in addition to the above effects (1) and (3).

(4)' In the construction of (1) and (3), the upper case 2 consists of the resinous frame portion 23, which is made of resin to have a shape like a frame, and the metal portion 22 provided at an inner side of the frame of the resinous frame portion 23, and the lower case 6 is provided with the metal portion 66. Further, the module structure is constructed so that the metal portions 22 and 66 are contacted with the top surface f the battery cell 3 and the bottom surface of the battery cell 4, respectively. This can improve the heat radiation due to the heat transfer of the battery cells 3 and 4, improving the correspondency to the expansion of the interior. Therefore, it can suppress the variation in temperature between the battery cells due to the improved the coolability.

The other operation and effects are similar to those of the second embodiment.

As explained above, the battery-cell module structure of the battery of the present invention has been described based on the first embodiment to the third embodiment, while a concrete construction is not limited to these embodiments, design changes, addition and the like are contained in the present invention as long as they do not deviate from the scope of the present invention according to written claims.

For example, the attachment of the end terminals of the lower case and the battery cells are performed with each other by using a screw fastening method, but it may employ a caulking joint method, a deposition-like spot welding method, an ultrasonic bonding method, a friction stir welding method and others.

The invention claimed is:

1. A battery-cell module structure of a battery comprising:
a resinous container main body that forms an inner space and has an opening portion that opens upward;
a battery cell consisting of one flat upper side assembled battery and one flat lower side assembled battery that have a thick center portion and a thin peripheral end portion, the flat upper side assembled battery and the flat lower side assembled battery being piled up in a vertical direction in the inner space;
a resinous frame body that surrounds the thick central portions between the thin peripheral end portions of the flat upper side assembled battery arranged at an upper side and the flat lower side assembled battery arranged at a lower side;
a resinous lid part that closes the opening portion of the resinous container main body; and
a ventilating means that is provided on the resinous container main body and has up and down symmetrical shape and size so as to communicate the inner space of the resinous container main body with an exterior of the ventilating means in such a way that the ventilating means cools the flat upper side assembled battery and the flat lower side assembled battery, suppressing a variation in temperature between the flat upper side assembled battery and the flat lower side assembled battery, wherein
the flat upper side assembled battery and the flat lower side assembled battery are put in the vertical direction between the resinous container main body, the resinous frame body and the resinous lid portion, wherein
a part of the resinous lid part is formed as a metal portion, and wherein
the metal portion is contacted with a top surface of the flat upper side assembled battery.

2. The battery-cell module structure of the battery according to claim 1, wherein
a part of the resinous container main body is formed as a metal portion, and wherein
the metal portion is contacted with a bottom surface of the flat upper side assembled battery.

3. The battery-cell module structure of the battery according to claim 2, further comprising:
a positioning portion that is provided on a bottom surface of the inner space of the resinous container main body to project upward; and a plurality of positioning hole portions that are provided in the flat upper side assembled battery, the flat lower side assembled battery and the resinous frame body, respectively.

4. A battery-cell module structure of a battery comprising:
a resinous container main body that forms an inner space and has an opening portion that opens upward;
a battery cell consisting of one flat upper side assembled battery and one flat lower side assembled battery that have a thick center portion and a thin peripheral end portion, the flat upper side assembled battery and the flat lower side assembled battery being piled up in a vertical direction in the inner space;
a resinous frame body that surrounds the thick central portions between the thin peripheral end portions of the flat upper side assembled battery arranged at an upper side and the flat lower side assembled battery arranged at a lower side;
a resinous lid part that closes the opening portion of the resinous container main body; and
a ventilating means that is provided on the resinous container main body and has up and down symmetrical shape and size so as to communicate the inner space of the resinous container main body with an exterior of the ventilating means in such a way that the ventilating means cools the flat upper side assembled battery and the flat lower side assembled battery, suppressing a variation in temperature between the flat upper side assembled battery and the flat lower side assembled battery, wherein
the flat upper side assembled battery and the flat lower side assembled battery are put in the vertical direction between the resinous container main body, the resinous frame body and the resinous lid portion, wherein
a part of the resinous container main body is formed as a metal portion, and wherein
the metal portion is contacted with a bottom surface of the flat upper side assembled battery.

5. The battery-cell module structure of the battery according to claim 4, further comprising:
a positioning portion that is provided on a bottom surface of the inner space of the resinous container main body to project upward; and
a plurality of positioning hole portions that are provided in the flat upper side assembled battery, the flat lower side assembled battery and the resinous frame body, respectively.

* * * * *